(12) United States Patent
Caylor et al.

(10) Patent No.: US 10,395,781 B2
(45) Date of Patent: Aug. 27, 2019

(54) IN-SITU DETERMINATION OF ROD CONTROL SYSTEM COIL AND CABLE IMPEDANCES FOR NUCLEAR POWER PLANTS

(71) Applicant: ANALYSIS AND MEASUREMENT SERVICES CORPORATION, Knoxville, TN (US)

(72) Inventors: Samuel D. Caylor, Knoxville, TN (US); Gregory W. Morton, Knoxville, TN (US); Hashem M. Hashemian, Knoxville, TN (US)

(73) Assignee: ANALYSIS AND MEASUREMENT SERVICES CORPORATION, Knoxville, TN (US)

( * ) Notice: Subject to any disclaimer, the term of this patent is extended or adjusted under 35 U.S.C. 154(b) by 348 days.

(21) Appl. No.: 15/145,480

(22) Filed: May 3, 2016

(65) Prior Publication Data
US 2017/0025193 A1   Jan. 26, 2017

Related U.S. Application Data

(63) Continuation-in-part of application No. 13/920,631, filed on Jun. 18, 2013, now abandoned, and a continuation-in-part of application No. 13/920,667, filed on Jun. 18, 2013, now abandoned, and a continuation-in-part of application No. 13/920,649, filed on Jun. 18, 2013, now abandoned.

(51) Int. Cl.
*G21C 7/06* (2006.01)
*G21C 7/12* (2006.01)
*G21C 17/10* (2006.01)
*G21C 17/112* (2006.01)
*G21D 3/00* (2006.01)

(52) U.S. Cl.
CPC .............. *G21C 7/12* (2013.01); *G21C 17/10* (2013.01); *G21C 17/112* (2013.01); *G21D 3/001* (2013.01); *Y02E 30/39* (2013.01)

(58) Field of Classification Search
CPC ... G21C 7/00; G21C 7/08; G21C 7/12; G21C 7/18; G21C 17/00; G21C 17/10; G21C 17/001
See application file for complete search history.

(56) References Cited

U.S. PATENT DOCUMENTS

| | | | | |
|---|---|---|---|---|
| 4,125,432 A | * | 11/1978 | Brooks, Jr. | G21C 7/12 376/233 |
| 4,143,416 A | * | 3/1979 | Luger | G01T 1/185 376/154 |
| 5,602,711 A | | 2/1997 | Curtis et al. | |
| 7,505,545 B2 | | 3/2009 | Kim et al. | |
| 2009/0252272 A1 | * | 10/2009 | Hashemian | G21C 7/08 376/258 |

* cited by examiner

*Primary Examiner* — Marshall P O'Connor
(74) *Attorney, Agent, or Firm* — Pitts & Lake, P.C.

(57) ABSTRACT

Systems and methods of monitoring a rod control system of a nuclear power plant, including calculating impedance of at least one coil of a rod movement mechanism non-intrusively while the system is operating, comparing a measured impedance to a reference impedance, and determining if the measured impedance deviates from the reference impedance value by a predetermined amount to indicate degradation of the rod control system.

8 Claims, 10 Drawing Sheets

IN-SITU DETERMINATION OF ROD CONTROL SYSTEM COIL AND CABLE IMPEDANCES FOR NUCLEAR POWER PLANTS

CROSS-REFERENCE TO RELATED APPLICATIONS

This application is a Continuation-In-Part of U.S. application Ser. No. 13/920,631, filed on Jun. 18, 2013, U.S. application Ser. No. 13/920,649, filed on Jun. 18, 2013, and U.S. application Ser. No. 13/920,667, filed on Jun. 18, 2013, the disclosures of which are incorporated herein in their entirety.

FIELD OF INVENTION

The present application relates generally to nuclear reactor rod control systems, and, more particularly, relates to systems and methods of monitoring rod control systems of nuclear power plants to determine whether the rod control system is operating properly.

BACKGROUND

In a nuclear Pressurized Water Reactor (PWR), the power level of the reactor is controlled by inserting and retracting control rods, which may include shutdown rods, in a reactor core.

Current designs of many nuclear power plants are equipped with control and shutdown rods which are inserted and withdrawn from the reactor core to control the reactivity by absorbing neutrons. Specifically, in Pressurized Water Reactors (PWRs), the movement of each rod is facilitated by its own electromechanical magnetic jack mechanism located atop the reactor vessel. Two examples of rod control systems that operate on this principle are the Control Rod Drive Mechanism (CRDM) and Control Element Drive Mechanism (CEDM). Both of these mechanisms consist of a set of coils that provide precise vertical movement to the rod by sequentially inducing a magnetic field in the coils to operate the mechanical parts of the system. The magnetic flux provides the energy needed to hold, insert, or withdraw the rod from the reactor core.

Thus, systems and methods to verify proper rod movement and to diagnose developing problems with the rod control systems would be valuable in maintaining proper and safe operation of nuclear plants.

BRIEF SUMMARY

Example embodiments of the present general inventive concept provide systems and methods of systems and methods of monitoring rod control systems of nuclear power plants to determine whether the rod control system is operating properly.

Additional features and embodiments of the present general inventive concept will be set forth in part in the description which follows and, in part, will be obvious from the description, or may be learned by practice of the present general inventive concept.

Example embodiments of the present general inventive concept can be achieved by providing a method of monitoring a rod control system of a nuclear power plant, including calculating impedance of at least one coil of a rod movement mechanism during plant operation using a non-intrusive method for evaluation of the coil(s), comparing a measured impedance to a reference impedance, and determining if the measured impedance deviates from the reference impedance value by a predetermined amount to indicate degradation of the rod control system.

The measuring operation can include analyzing rod control system current and voltage signals of the at least one coil while the system is in operation in the plant.

The measuring operation consists of non-intrusive measurements that do not hinder operations.

The measuring operation can include analyzing the impedance, consisting of resistance and inductance measurements, of any of the coils that make up the rod control mechanism.

The measurements can determine health of coils, cables, and connectors which together make up the rod control mechanism.

The reference impedance can be based on a recorded impedance of the rod movement mechanism during operation of the nuclear power plant.

Example embodiments of the present general inventive concept can also be achieved by providing a method of monitoring a rod control system of a nuclear power plant, including measuring voltage and current signals of at least one coil of a rod movement mechanism during plant operation using a non-intrusive method for evaluation of the coil(s), calculating an impedance of the least one coil based on measured voltage and current signals, recording a plurality of impedance calculations over a period of time, and determining whether a current recorded impedance changes relative to a prior recorded impedance by a predetermined amount to indicate degradation of the rod control system.

Example embodiments of the present general inventive concept can also be achieved by providing a system to monitor a rod control system of a nuclear power plant, including an impedance determining unit to determine an impedance of at least one coil of a rod movement mechanism during a rod movement sequence of the rod control system, and a controller to compare a measured impedance to a reference impedance, and to determine if the measured impedance deviates from the reference impedance value by a predetermined amount to indicate degradation of the rod control system.

The controller can be configured to analyze current and voltage measurements of the at least one coil over a plurality of rod movement sequences.

Example embodiments of the present general inventive concept can also be achieved by providing a system to monitor a rod control system of a nuclear power plant, including an impedance determining unit to determine an impedance of at least one coil of a rod movement mechanism during a rod movement sequence of the rod control system during operation of the nuclear power plant, and a controller to record a plurality of impedance calculations over a period of time, and to determine whether a current recorded impedance changes relative to a prior recorded impedance by a predetermined amount to indicate degradation of the rod control system.

Example embodiments of the present general inventive concept can also be achieved by providing a system to monitor a rod control system of a nuclear power plant, including an impedance measuring unit configured to obtain signal values from existing plant test points of at least one component of a rod movement mechanism during operation of the nuclear power plant, and to utilize the obtained signal values to determine a present impedance of the at least one component of the rod movement mechanism during the operation of the nuclear power plant, and a control unit configured to compare the present impedance to a reference impedance, and to indicate degradation of the rod control system if the present impedance deviates from the reference impedance by a predetermined amount.

Example embodiments of the present general inventive concept can also be achieved by providing a method of monitoring a rod control system of a nuclear power plant using a system an example embodiment system such as described herein, the method including obtaining signal values from existing plant test points of at least one component of a rod movement mechanism during operation of the nuclear power plant, utilizing the obtained signal values to determine a present impedance of the at least one component of the rod movement mechanism during the operation of the nuclear power plant, comparing the present impedance to a reference impedance; and indicating degradation of the rod control system if the present impedance deviates from the reference impedance by a predetermined amount.

Example embodiments of the present general inventive concept can also be achieved by providing a method of monitoring a rod control system of a nuclear power plant, the method including establishing reference signals corresponding to normal operation of at least one coil of a rod control system during a step operation of the rod control system, the reference signals including a plurality of reference values corresponding to various energy states and transitions of energy states occurring during operational sequences of the at least one coil, obtaining in situ signals from the at least one coil during an operational sequence of the at least one coil during operation of the nuclear power plant, the in situ signals including a plurality of in situ values corresponding to various energy states and transitions of energy states occurring during present operational sequences of the at least one coil, comparing the in situ values to the reference values; and determining whether the in situ values associated with a particular energy state or transition of energy states deviates from a corresponding reference value associated with the particular energy state or transition of energy states by a predetermined amount, and, if so, associating the deviation with a particular degradation of the rod control system.

Additional features and aspects will be apparent from the following detailed description, the drawings, and the claims.

BRIEF DESCRIPTION OF THE DRAWINGS

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION

Reference will now be made to various example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The described progression of processing operations described are merely examples, however, and the sequence of operations is not limited to that set forth herein and may be changed as is known in the art, with the exception of operations necessarily occurring in a certain order. Also, description of well-known functions and constructions may be omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation illustrated in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Various example embodiments of the present general inventive concepts provide systems and methods improve the versatility, practicality, and efficiency of control rod systems in nuclear power plants. For example, embodiments of the present general inventive concept can be configured to monitor operation of rod control systems to verify proper movement of control rods in nuclear power plants. Example embodiments have been developed to aid in verifying proper rod movement from the coil current traces, due to increasing occurrences of slipped and stuck rods throughout the nuclear industry. As another example, embodiments of the present general inventive concept have been developed to determine, during normal plant operation, impedance measurements that can be used to verify proper operation of the coils, cables, and connectors that make up the rod control mechanism. Detected changes in impedance can be used to detect degradation and aging. As another example, embodiments of the present general inventive concept provide systems and methods to confirm rod movement, determine step movements, and provide step indication of control rods in nuclear power plants. While existing methods make count steps based on demands from the control room, embodiments of the present general inventive concept make an assessment of rod movement from the output of the rod movement mechanism. This allows steps to only be counted when movement actually occurs based on verification of a proper rod movement sequence. Such a method will help mitigate step count errors which can cause reactor trips.

Figure 1:
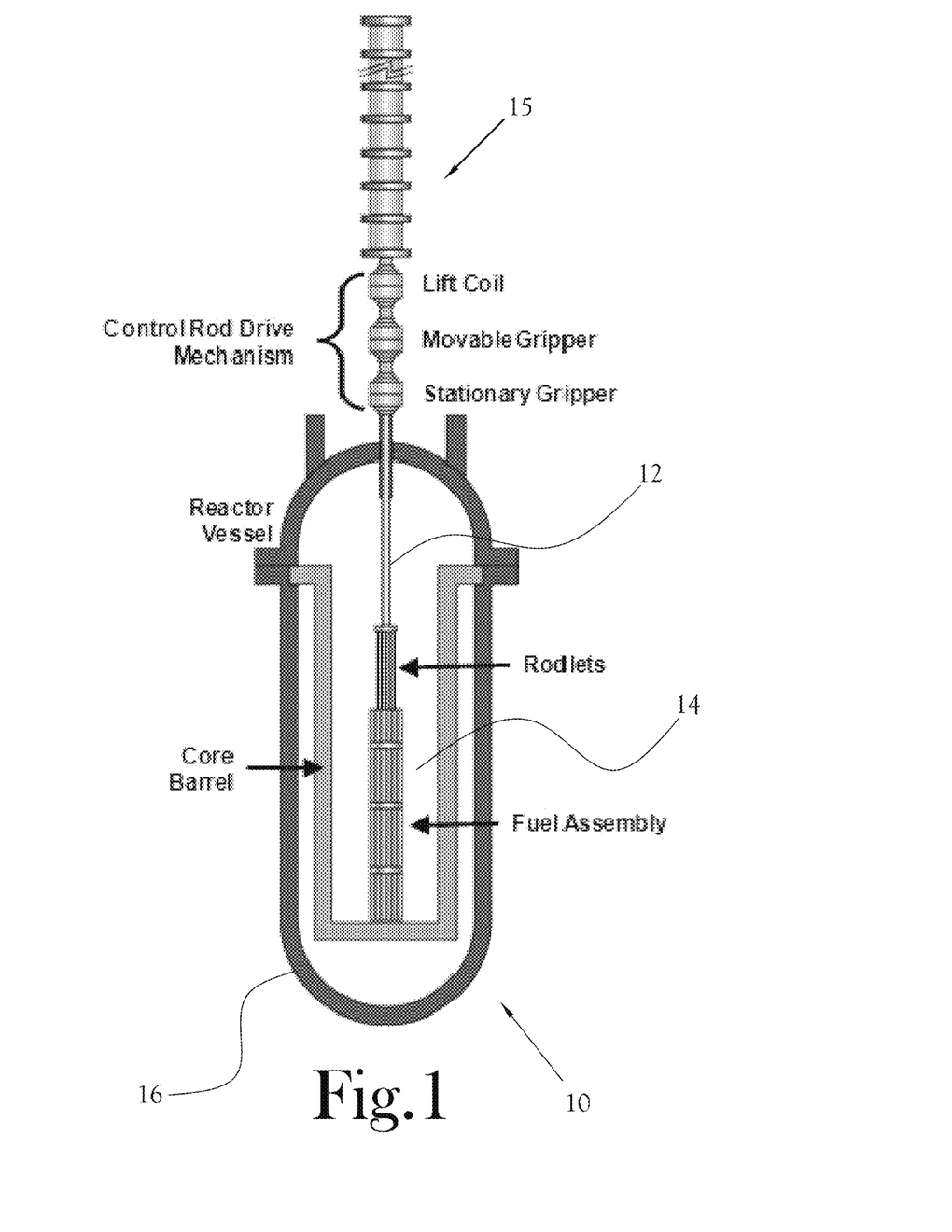
FIG. 1 illustrates a cross section of a rod control and position system for a pressurized water reactor according to an example embodiment of the present general inventive concept.

FIG. 1 illustrates a cross section of a rod position control system 15 for a Pressurized Water Reactor according to an example embodiment of the present general inventive concept. Referring to FIG. 1, the power level of the reactor 10 is controlled by inserting and retracting control rods 12 (which may include the shutdown rods) into the reactor core 14 to control the reactivity by absorbing neutrons. Movement of each rod may be facilitated by its own electromechanical magnetic jack mechanism located atop a reactor vessel referred to as a rod control system, or rod position control system 15.

In the embodiment of FIG. 1, the control rods are moved by a Control Rod Drive Mechanism (CRDM) which uses electromechanical jacks to raise or lower the control rods in increments. The CRDM may include a lift coil, a moveable coil, and a stationary coil controlled by a Rod Control System (RCS), and a ferromagnetic drive rod coupled to the control rod to move within a pressure housing 16. The drive rod may include a number of circumferential grooves at single step intervals ("steps") that define a range of movement for the control rod. An example step interval may be ⅝ inch. An example drive rod may contain approximately 231 steps, or grooves, which may vary. A moveable gripper mechanically engages the grooves of a drive rod when its coil is energized, and disengages from the drive rod when the coil is de-energized. Energizing a lift coil raises the moveable gripper and the associated control rod if the moveable coil is energized by one step. Energizing the moveable coil and de-energizing the lift coil moves the control rod down one step. Similarly, when energized, a stationary gripper engages the drive rod to maintain the position of the control rod and, when de-energized, disengages from the drive rod to allow the control rod to move. A conventional system may include two coil stacks for each control rod and the associated componentry for processing the signals from the coil stacks. Each coil stack may be an independent channel of coils placed over the pressure housing. Each channel typically includes 21 coils, and the coils may be interleaved and positioned at approximately 3.75 inch intervals (6 steps). The coil stack assembly includes a set of coils that generate magnetic flux. For example, the coil stack assembly can provide magnetic energy for a latch assembly. It surrounds the latch housing and includes three coils that operate corresponding magnets in the latch assembly. Nickel-plated cast iron components may provide the support structure for the coils and conduct magnetic flux to the latch assembly. Electrical connectors may be sealed against moisture and dust and are easily coupled and uncoupled. The coils receive electrical impulses from a system such as a CRDM control system and are cooled externally by forced air. The latch assembly converts the magnetic energy into linear motion. A drive rod assembly connects a CRDM motor to a control rod. A pressure housing retains the reactor coolant and supports other components of the CRDM.

The RCS may include a logic cabinet and a power cabinet, which are described in more detail herein. The logic cabinet may receive manual demand signals from an operator or automatic demand signals from a reactor control and provides command signals needed to operate shutdown and control rods according to a predetermined schedule. The power cabinet provides a programmed current. The rod movement demand, generated by either the operator or the reactor control system, is received and processed by the cabinet logic. The logic cabinet then controls the power switching circuitry that is responsible for the motion of the rod control mechanism. There are currently three different power levels that the switching circuitry provides to the drive mechanism. These power levels include the 'High' state, which is used to quickly energize the coil, 'Reduced', which is used to maintain the energized state, and 'Low', which is used for the coil in the off state. The logic cabinet is responsible for providing the sequence at which these power levels should be applied to the coils for the desired rod movement.

Figure 2:
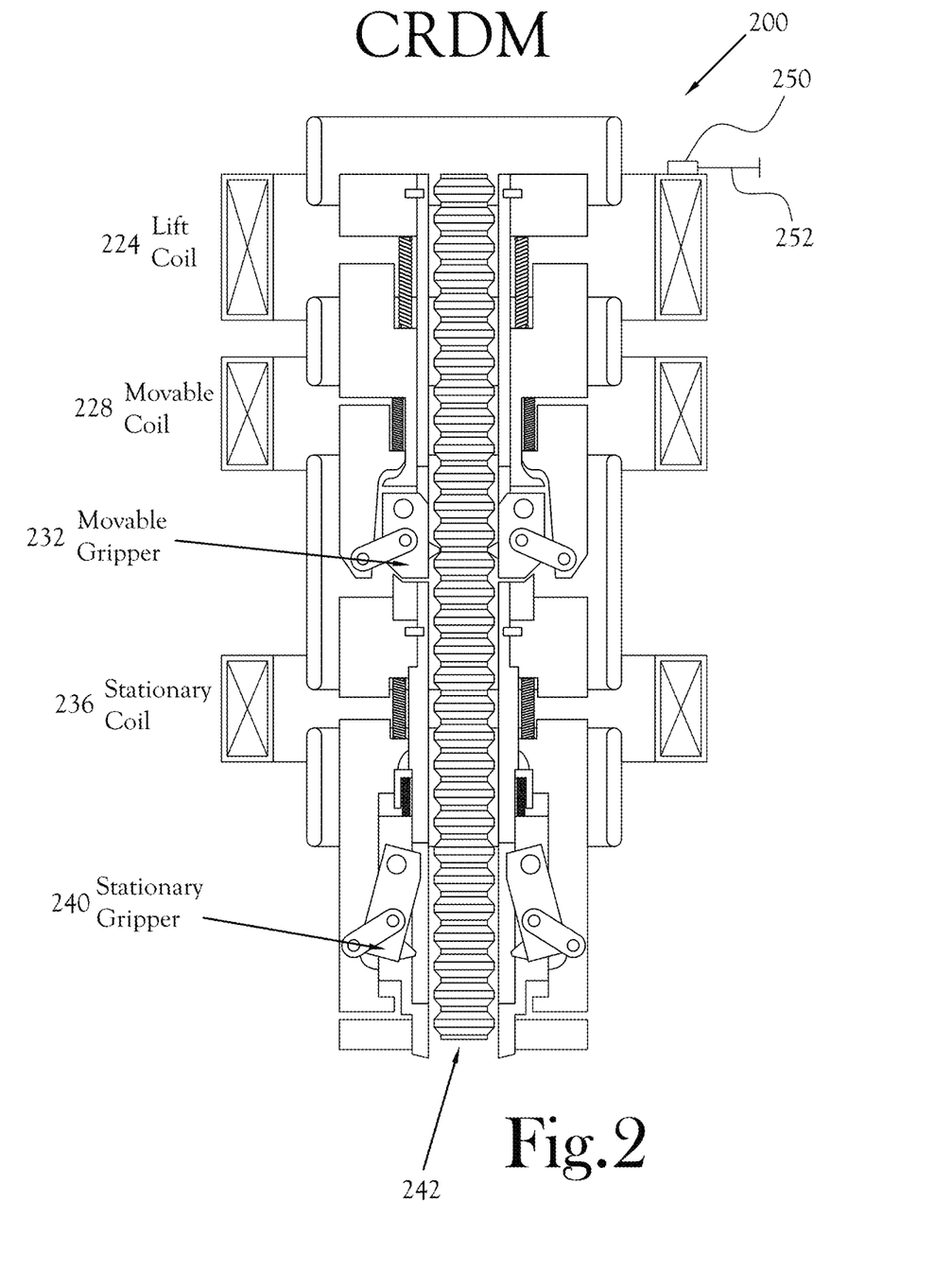
FIG. 2 illustrates a cross section of a Control Rod Drive Mechanism (CRDM) system according to an example embodiment of the present general inventive concept.

FIG. 2 illustrates a cross section of a Control Rod Drive Mechanism (CRDM) system according to an example embodiment of the present general inventive concept. As illustrated in FIG. 2, an example CRDM system 200 includes three electric coils (Lift Coil 224, Movable Coil 228, and Stationary Coil 236) and two electromagnetic jacks with grippers (Movable Gripper 232 and Stationary Gripper 240). A connector 250 and cable 252 are illustrated to indicate possible test points for system analysis to check signal levels associated with the coils, but for the sake of clarity only one such connector and cable are illustrated. It is understood that such cables and connectors may be found at numerous locations and associated with various components in this and similar systems. The drive rod 242 is grooved which allows the grippers to engage and support the weight of the drive rod 242. These grooves allow the mechanism to insert and withdraw the rod in ⅝" steps. The moveable gripper 232 mechanically engages the grooves of the drive rod 242 when its coil is energized, and disengages from the drive rod 242 when the coil is de-energized. Energizing the lift coil 224 raises the moveable gripper 232 and the associated control rod if the moveable coil 228 is energized by one step. Energizing the moveable coil 228 and de-energizing the lift coil 224 moves the control rod down one step. Similarly, when energized, the stationary gripper 240 engages the drive rod 242 to maintain the position of the control rod and, when de-energized, disengages from the drive rod 242 to allow the control rod to move.

Figure 3:
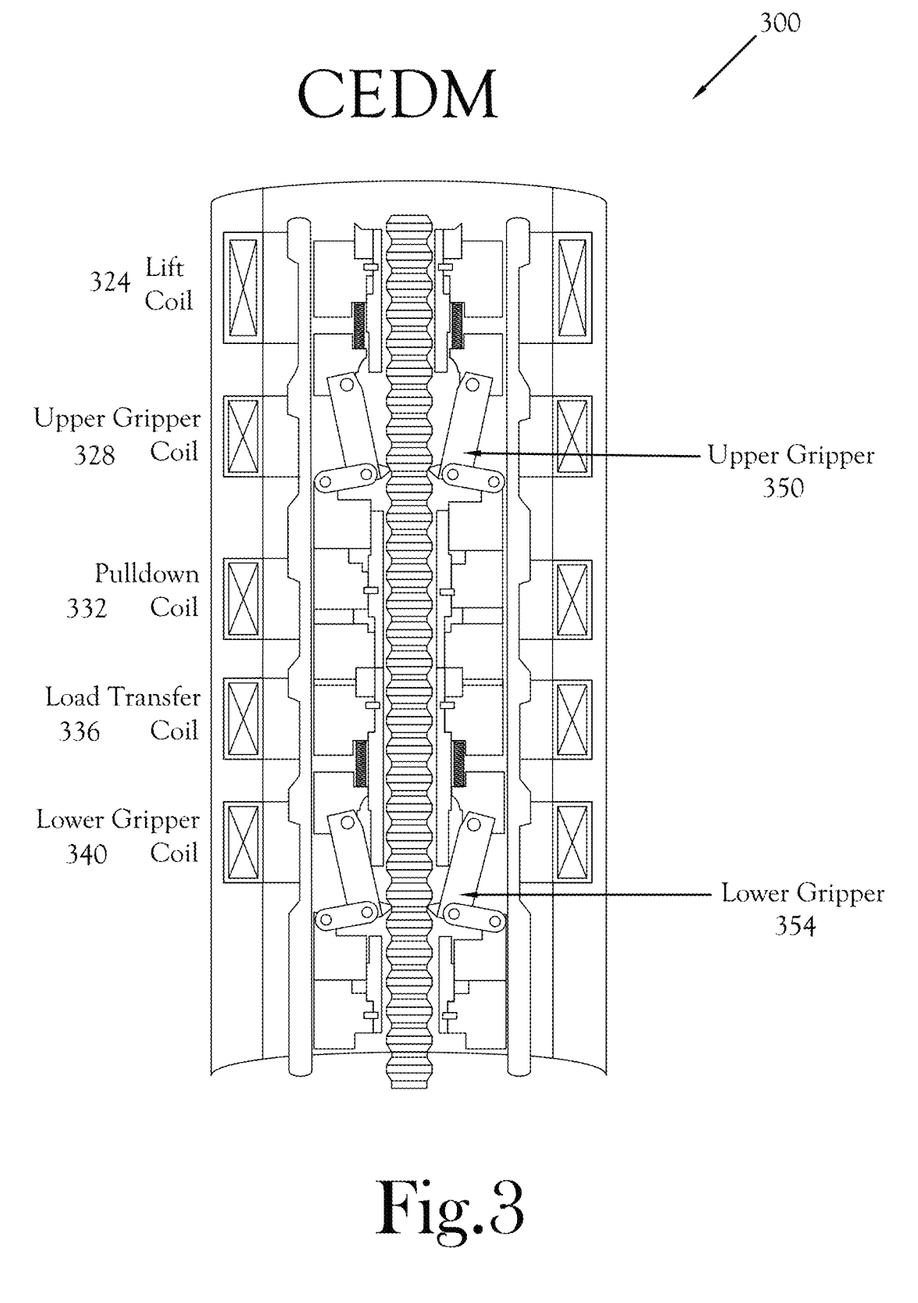
FIG. 3 illustrates a cross section of a Control Element Drive Mechanism (CEDM) according to an example embodiment of the present general inventive concept.

FIG. 3 illustrates a cross section of a Control Element Drive Mechanism (CEDM) system according to an example embodiment of the present general inventive concept. As illustrated in FIG. 3, an example CEDM system 300 includes five electric coils (Lift Coil 324, Upper Gripper Coil 328, Pulldown Coil 332, Load Transfer Coil 336, and Lower Gripper Coil 340) and two electromagnetic jacks with grippers (Upper Gripper 350 and Lower Gripper 354). The drive rod for this system is grooved to allow the rod to insert or withdraw from the reactor core in single step increments, for example, ¾" steps, when the coils are energized in a particular sequence. The sequencing is established by the logic cabinet through a set of current orders which are provided to the power cabinet firing and regulation cards for low, reduced, or full levels of current to be applied to the coils.

Figure 4:
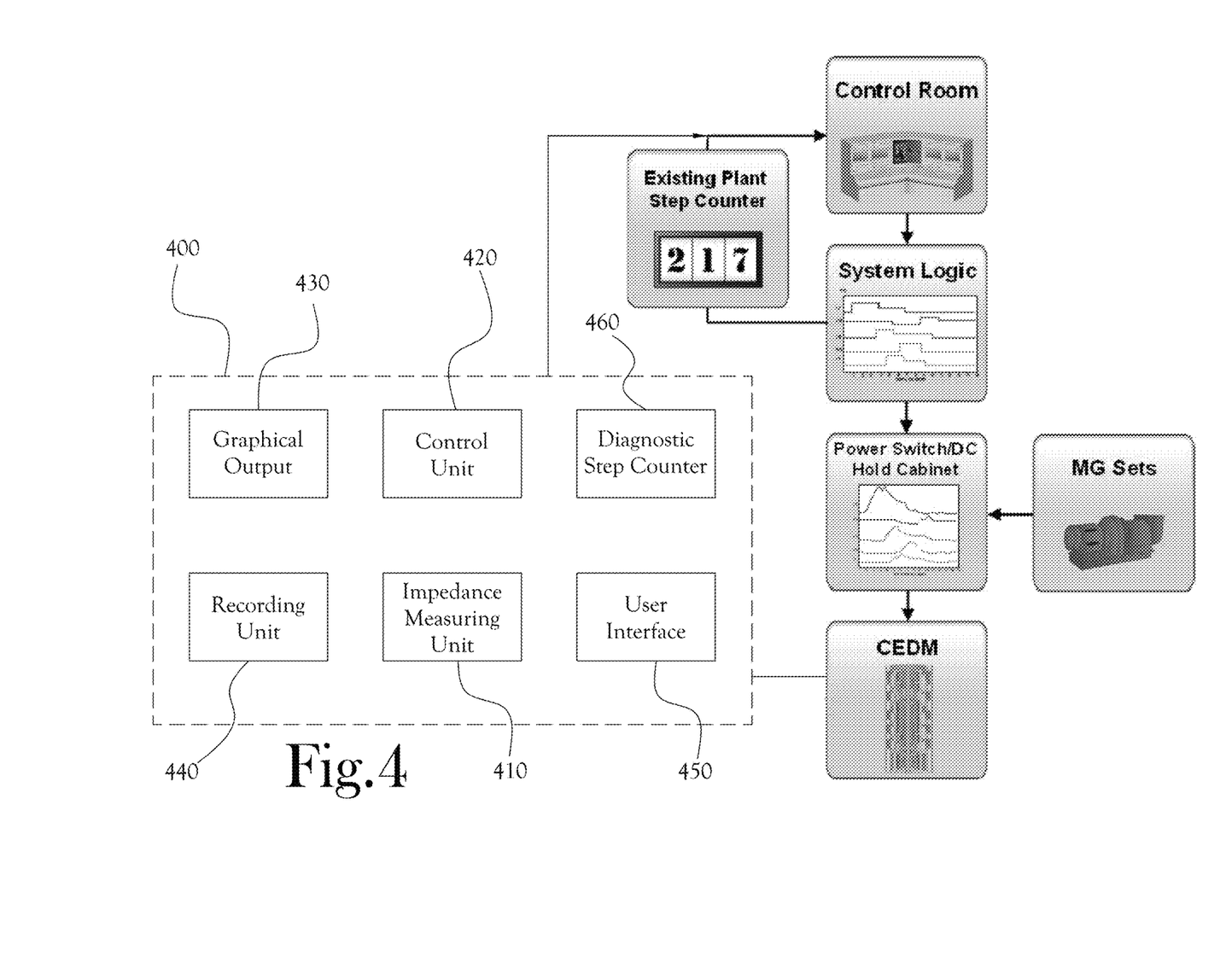
FIG. 4 is a block schematic diagram of a rod control system for a CEDM according to an example embodiment of the present general inventive concept.

FIG. 4 is a block schematic diagram of a rod control system for a CEDM according to an example embodiment of the present general inventive concept. It is noted that while FIG. 4 illustrates a CEDM system, many of the elements and procedures will be the same or similar to a CRDM or other similar system. For example, although an example connector 250 and cable 252 are illustrated for the lift coil 224 of the CRDM system illustrated in FIG. 2, it is understood that such elements are also present in the CEDM system of FIG. 3. Referring to FIG. 4, an example rod control system includes controls and indicators in the main control room, control logic cabinets, power switching cabinets, power distribution from the motor generator sets, and the rod control mechanism itself. FIG. 4 also illustrates a system to monitor the rod control system of a nuclear power plant, the system 400 configured such that a user may measure impedance of at least one coil of the rod control system during operation of the nuclear power plant during normal operation, so that diagnostic evaluations may be made without intrusive efforts such as shutting down the plant or CRDM system. The system 400 may include an impedance measuring unit 410 to measure impedance of a coil, or associated cables or connectors, at existing site test points without interrupting service, and a control unit 420 to compare the measured impedance value to an associated reference impedance value and to determine if the measured impedance value deviates from the reference impedance value. The impedance measuring unit 410 may be configured to obtain voltage and/or resistance values of at least one of a coil, cable, and a connector of the rod control system, and use these obtained valued to determine the impedance of the component. Thus, the impedance measuring unit 410 may measure impedance by using obtained voltage and/or current measurements to determine the impedance. The measurements can determine health of coils, cables, and connectors which together make up the rod control mechanism. Deviation from the reference value by a predetermined amount may indicate degradation of the rod control system. The control unit 420 may be configured to analyze current and voltage measurements of the coil or associated component. The reference impedance value may be based on historical impedance measurements of the rod movement mechanism during operation of the nuclear power plant. The system 400 may include a recording unit 440 to record a plurality of impedance calculations obtained over time during operation of the power plant. The control unit 420 may compare a current calculated impedance value with the prior recorded impedance value to determine if there is a deviation that indicates a problem with the rod control system. Changes in impedance can indicate degradation and aging of the components/system. The system 400 may be provided with a user interface 450 to allow a user to interact with the system in order to, for example, identify coils or other components to be tested, and a graphical output 430 may be provided to display values such as component identification, graphical signal responses, etc. For example, the graphical output 430 may display measured voltage and current values associated with a lift coil over at least one step of a cycle such as a lift movement cycle, in which the rod is lifted by a step. Example embodiments of the system may also include a diagnostic step counter 460 to count steps corresponding to measure values, the counting of the steps being comparable to the count kept by the existing plant step counter. According to various example embodiments of the present general inventive concept, more or less components may be included in the system 400, which may be handheld for ease of movement to different stations in the nuclear power plant. Taking into consideration heat resistance properties of the coil such as coil material, coil length, coil thickness, number of wraps of coil, heat capacity of material, etc., the impedance values and/or current/voltage values measured over time can be used by the control unit to determine coil temperature. For example, in some embodiments, it is possible to determine that lower resistance values measured over time can result in the coil heating to a higher temperature faster.

Figure 5:
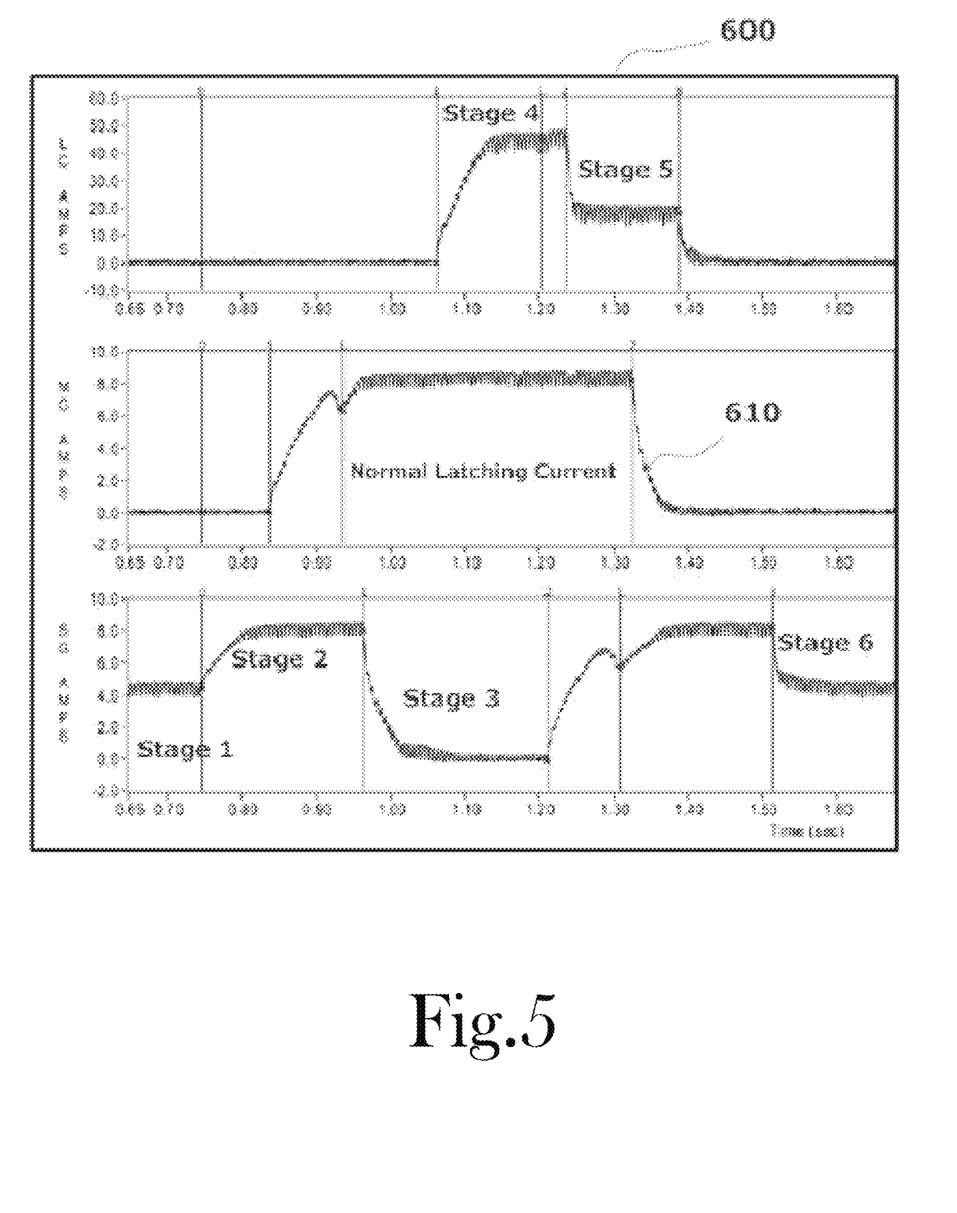
FIG. 5 is a an example of CRDM currents for a withdrawal sequence according to an example embodiment of the present general inventive concept.

FIG. 5 is an example of CRDM currents for a withdrawal sequence according to an example embodiment of the present general inventive concept. As illustrated in FIG. 5, the coil current data embodies information that can be used to determine proper rod movement and operation. For example, the latching of the stationary and moveable gripper can be confirmed in the coil current data. A rod latching problem could result in a rod slipping or dropping causing the step count in the control room to become unreliable.

The current diagram 600 shows a normal current 610 trace when the rod is withdrawn from a reactor vessel as requested from control signals associated with a withdrawal sequence. Referring to FIG. 5, during a Stage 1, a Stationary Gripper (SG) coil is energized to a reduced current, wherein the SG is the only gripper supporting the rod shaft. In a Stage 2, the SG coil is energized to full, while a Moveable Gripper (MG) coil energizes and latches to the rod shaft. In a Stage 3, the SG coil discharges to an inactive state so that the rod load is transferred completely to the MG. In a Stage 4, the Lift Coil (LC) is energized to full until the rod shaft is lifted a predetermined amount. In a Stage 5, the LC is reduced until the SG coil energizes and latches the gripper again. In a Stage 6, once the SG is latched, the LC and MG disengage, the SG coil discharges to reduced current and the CRDM is returned to Stage 1.

Figure 6:
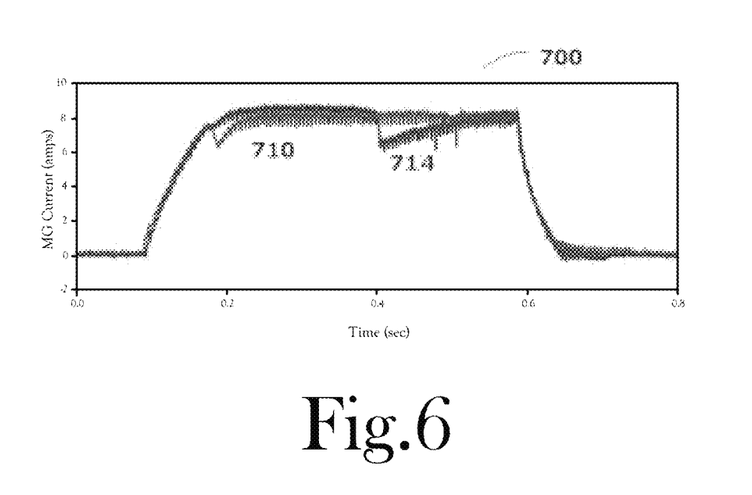
FIG. 6 is a diagram of example improper moveable gripper latching signals according to an example embodiment of the present general inventive concept.

FIG. 6 is a diagram of example improper moveable gripper latching signals according to an example embodiment of the present general inventive concept. As illustrated in FIG. 6, in addition to timing and sequencing, the coil current data holds much more information concerning proper rod movement and operation, and the latching of the stationary and moveable gripper can be confirmed in the coil current data. This is important as a latching problem could result in a rod slipping or dropping causing the step count in the control room to become unreliable.

Figure 7:
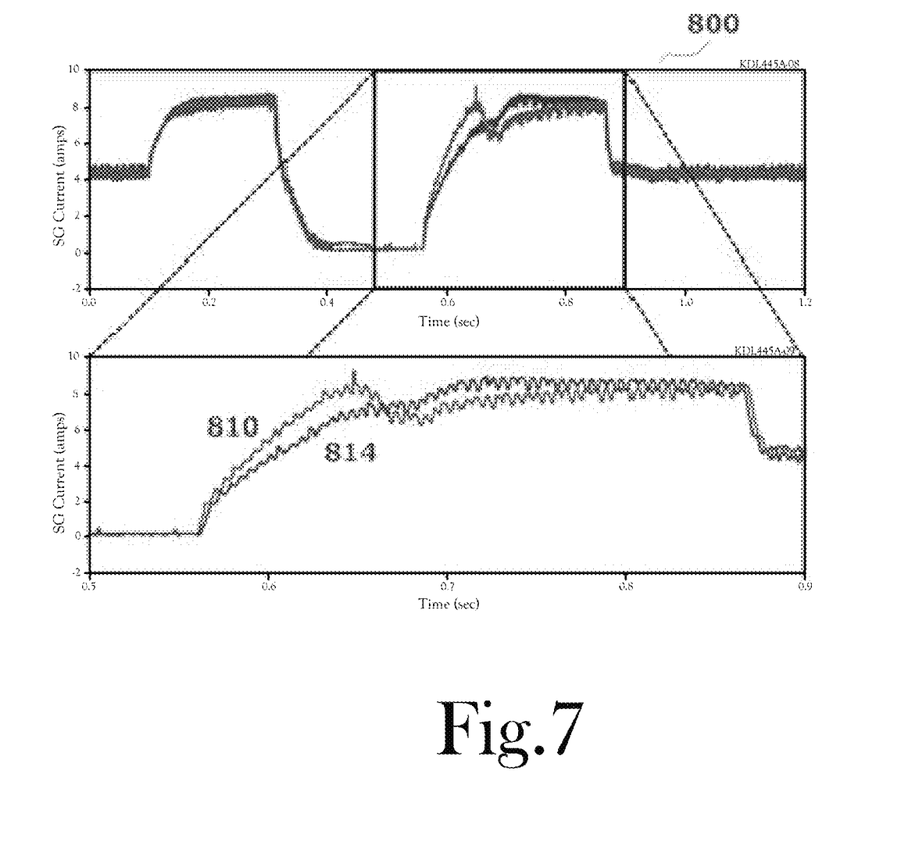
FIG. 7 illustrates diagrams of example improper rod movement signals according to an example embodiment of the present general inventive concept.

FIG. 7 illustrates diagrams of example improper rod movement signals according to an example embodiment of the present general inventive concept. As illustrated in FIG. 7, a rod has become temporarily immovable. In this figure, two stationary coil traces collected on the same rod are shown. The trace 814 shows the stuck rod and the\trace 810 shows the rod right after the problem was resolved. To help diagnose this problem, and any other issues with CRDM loading, example methods were developed to determine proper rod movement, examples of which are illustrated in FIG. 8.

Figure 8:
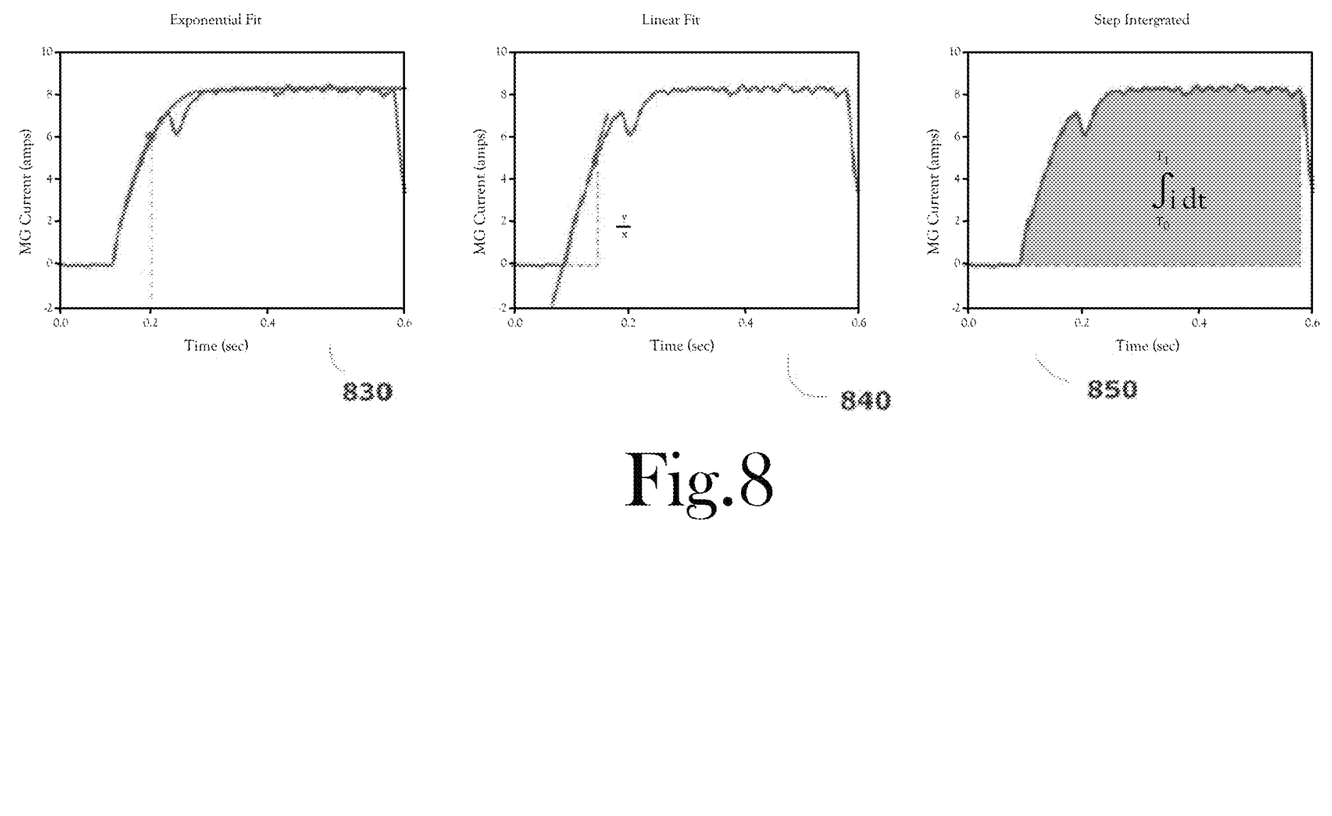
FIG. 8 illustrates diagrams of example rod movement fitting methods according to an example embodiment of the present general inventive concept.

FIG. 8 illustrates diagrams of example rod movement fitting methods according to an example embodiment of the present general inventive concept. An example method 830 applies a simple exponential fit to the current traces and calculates a response metric of the CRDM to the rod movement request. Another method 840 applies a linear fit to the rise of the current trace, and the slope is used as an indication of proper rod movement. Another method 850 calculates the integral of the current from the time the current goes high until it returns to the low or reduced state. These example methods produced a useful metric for determining rod movement problems, and the results were very accurate from step to step with a significant change noticed when a problem did exist. Other known or later developed methods could also be implemented without departing from the broader scope and spirit of the present general inventive concept.

Example systems and methods of the present general inventive concept can be used to make non-intrusive impedance measurements on rod control system coils in-situ. Coil signal measurements such as coil voltage and coil current can be acquired from existing plant test points.

Figure 9:
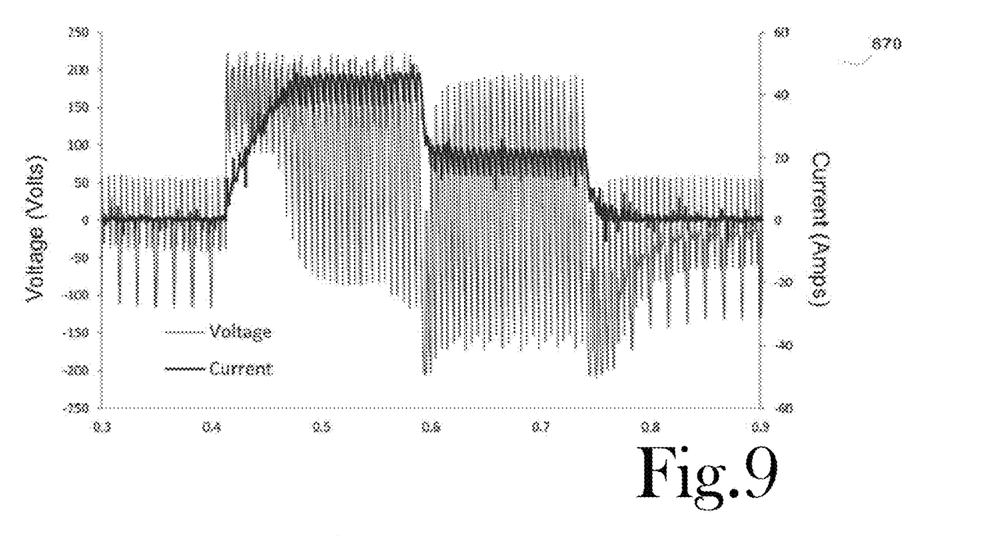
FIG. 9 is a diagram of an embodiment of lift coil voltage and current during one step of a CRDM rod movement according to an example embodiment of the present general inventive concept.

FIG. 9 illustrates an example graph 870 of measured voltage and current applied to a lift coil over time during one step of a CRDM movement cycle according to an example embodiment of the present general inventive concept. The relationship of measured voltage and current over time may be utilized to determine coil and cable health. A change in these values may be an indication of a rod movement failure, electrical degradation, or mechanical degradation. Voltage and current measurements may be used in determining coil and cable health in a non-intrusive impedance measurement on the CRDM coils.

Figure 10:
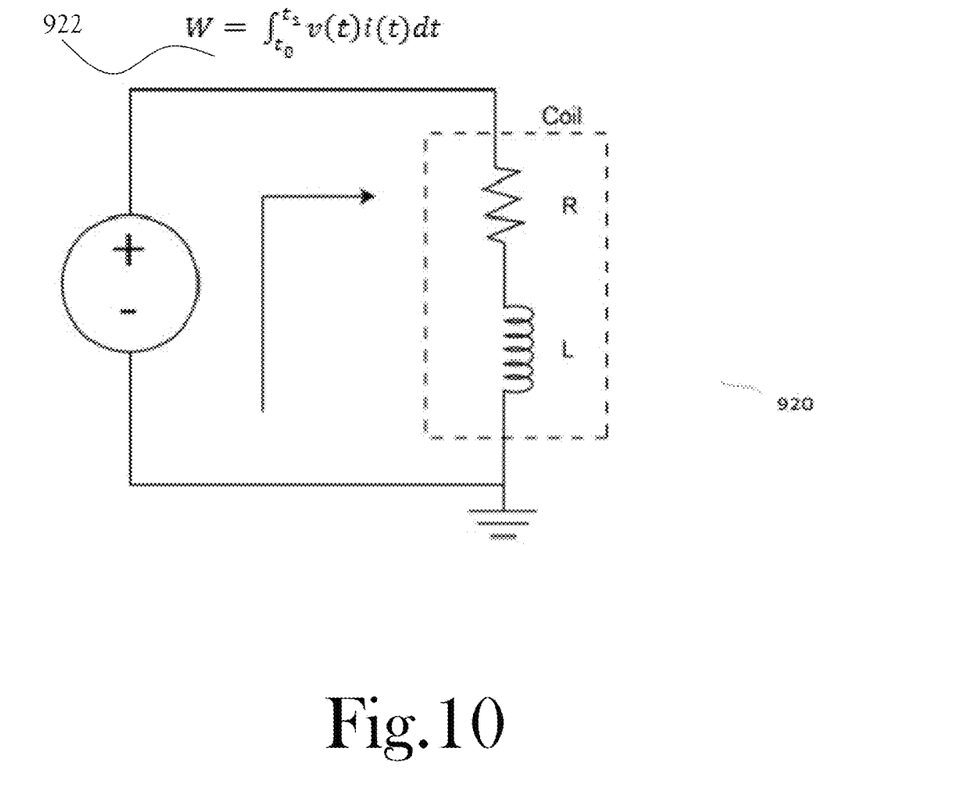
FIG. 10 illustrates an equivalent electrical circuit of a CRDM coil according to an example embodiment of the present general inventive concept.

FIG. 10 provides an example equivalent electrical circuit 920 of a CRDM coil embodiment according to an example embodiment of the present general inventive concept. This circuit allows the resistance and inductive portions of the coil to be calculated.

If the current $I_{COIL}$ in the coil is at steady state, the inductance L in the coil can be treated as a short, resulting in a purely resistive coil R. This leaves the resistance of the coil R to be calculated by Ohm's law as shown by Equation 928.

$$R = V_{REG}/I_{COIL} \quad \text{(Equation 928)}$$

Using the resistance value from equation 928, the inductance L in Equation 932 can be solved accordingly.

$$V_{REG} = \frac{d(LI)}{dt} + RI \quad \text{(Equation 932)}$$

The amount work (W) delivered to a coil over a period of time can be calculated using equation 922 illustrated in FIG. 10. In an example, the work can be calculated over a rod movement sequence to detect changes in the amount of energy needed to move the rod. The examples described herein provide a metric which may be utilized to diagnose rod movement problems because the calculation results may be predictable from step to step wherein a significant variation from normal may be noticed because one or more problems such as, for example, improper rod movement, rod movement failure, electrical degradation, mechanical degradation, etc., exists. Changes in the level of work, and/or changes in impedance and related values, can detect problems with the mechanism.

Presently, step counters that are used to display the current step of the drive mechanism are based on up or down rod movement commands coming from either the reactor operator or reactor control system. Since the step counter is based on demanded movement, and not actual movement, the information may become inaccurate if a problem occurs in the drive mechanism or rod control system. An example solution is with a data driven solution that uses the outputs of the drive mechanism coils to confirm rod movement and determine the step of the rod.

Figure 11:
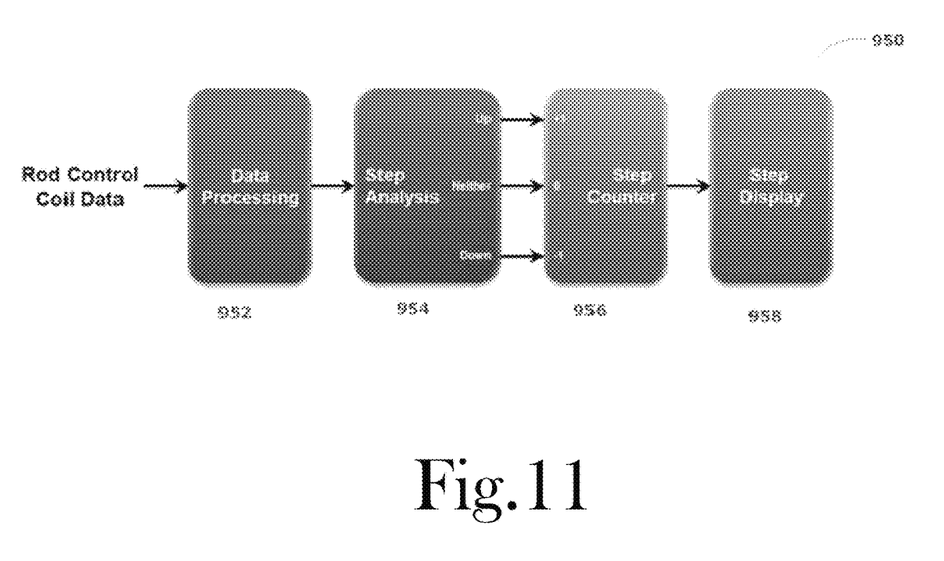
FIG. 11 illustrates a block diagram of a data driven step counter system according to an example embodiment of the present general inventive concept.

FIG. 11 illustrates a block diagram of a data driven step counter system according to an example embodiment of the present general inventive concept. In this embodiment, the data driven step counter applies advanced analysis techniques to signals acquired from existing plant test points so that no additional sensors are required to confirm the actual movement of the rod. The counter is configured to detect the beginning of a new rod movement event. The raw data from drive mechanism can then be processed 952 to prepare it for step analysis 954. In some embodiments, the step analysis determines the direction of the step, validates the sequencing, verifies that the latches have properly engaged, and confirms that the LC properly lifts its responsible gripper assembly. If the step analysis concludes that an insert or withdraw movement has actually occurred, the step counter will be decremented or incremented respectively. If the step analysis detects an error with the sequence, latching, or movement of the rod, the step counter can remain on its current step and a warning can be provided. The step counter stores the current step and sends the step information to the step display 958. The step display provides step indication for all drive mechanisms.

Figure 12:
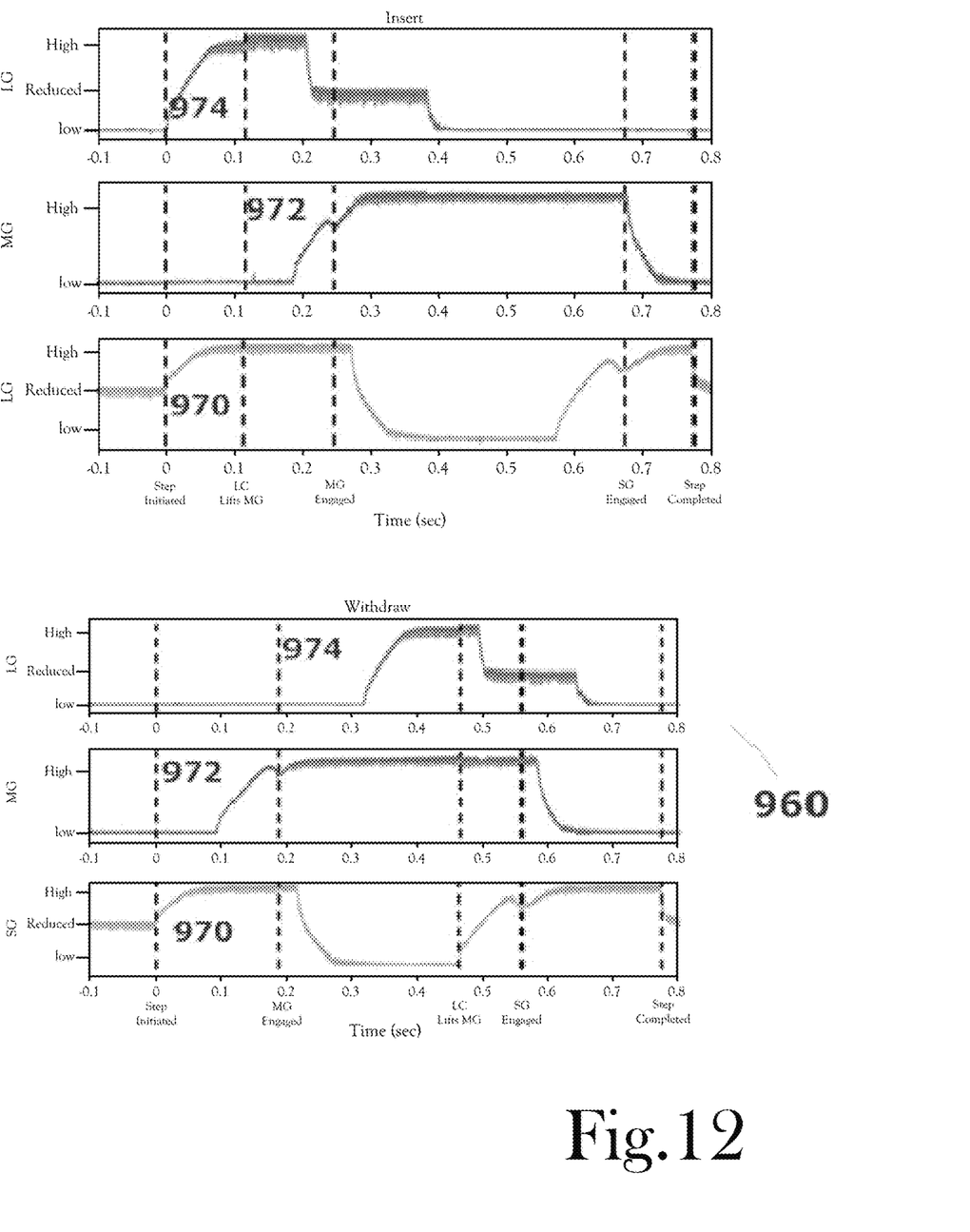
FIG. 12 illustrates a timing diagram of an embodiment of CRDM current signals for an insertion and withdrawal sequence according to an example embodiment of the present general inventive concept.

FIG. 12 illustrates a timing diagram of an embodiment of CRDM current signals for an insertion and withdrawal sequence according to an example embodiment of the present general inventive concept. Example embodiments of the data driven step counter can determine the direction of the step based on the initial condition of the step. For example, with the CRDM system as illustrated in FIG. 7, steps start with the SG going 'High' 970 and the direction can be determined based on the states of the other two coils. If the MG engages prior to the LC going high, the step can be determined to be a withdrawal. If the LC is energized high 974 before the MG engages, the step can be determined to be an insertion. Thus, the step direction can be determined from the coil output data.

Referring to FIG. 12, the counter can be configured to verify that the sequence for the demanded direction was correct before the step can be considered. Using a CRDM as an example, if the LC engages too late during an insertion sequence it could actually cause the rod to move in the wrong direction. Therefore, in some embodiments, the data from the coil outputs can be used to verify the sequence of the 'High', 'Reduced', and 'Low' states from each of the coils and, consequently, to determine if a step could have occurred. The CEDM and CRDM rod control systems consist of different components and both utilize a particular sequence of events in order to move the rod in the demanded direction. However, the methods are not limited to the sequences described in this example. For example, some plants have implemented a double gripper modification for the CRDM which allows both the MG and SG to support the weight of the rod during a hold state. Although such modifications may change the sequence of events used by the CRDM to complete a step, the example systems and methods of the present general inventive concept can still be applied for considering the rod movement.

In some embodiments, verifying the sequencing of the coil states alone may not be enough to verify that a step of the drive rod has occurred. For example, the latching of the magnetic jacks may be confirmed as well as the times at which the latches occur. Moreover, the coil(s) associated with a given gripper may go to a high state but that does not guarantee that the latch was properly engaged. To verify the latch engagement, embodiments of the present general inventive concept examine the phenomena which causes the latch 'dip' in the coil output data. That is, when a gripper coil has enough energy it causes the gripper assembly to be slightly lifted causing the gripper to engage the grooved rod. The upward movement of the gripper causes a back EMF to be induced in the coil which causes the latch 'dip' seen on the coil current data. For example, if the lift coil cannot perform the lift movement over the distance required to complete one step the rod will most likely remain on the current step. Additionally, if the rod becomes stuck, LC only partially lifts the gripper assembly, or some other obstacle hinders the grippers to fully engage or disengage it will be detected in the gripper movement analysis. Further analysis of this change in current can verify that the grippers have been fully engaged or disengaged, and that the lift coils have properly lifted the gripper assembly for which they are responsible. The time at which the latch has been engaged should also be compared to other critical events in the coil sequence. For instance, if the MG disengages prior to the SG engaging in the step of the CRDM, then the rod may slip or completely be dropped into the reactor core.

An example embodiment of the present general inventive concept may provide a method of monitoring a rod control system of a nuclear power plant including measuring an input to and/or output signal from at least one coil of a rod movement mechanism at one or more predetermined times relative to an initial energizing of a mechanism coil, calculating a signal parameter from the measured signal and comparing the measured signal to a reference signal parameter; and determining if the calculated parameter deviates from the reference signal parameter by a predetermined amount to indicate impairment of the rod control system. In example embodiments, the reference signal parameter may be based on at least one of the following: an ideal exponential curve; an ideal linear curve; the integral of a reference signal curve over a predetermined time interval and a work calculation from a reference rod movement mechanism input and output An example embodiment of the present general inventive concept may provide a system to monitor rod movement signals of a rod control system of a nuclear power plant including a system to measure one or more signals applied to at least one coil of a rod movement mechanism, and a controller to acquire a measured signal at one or more predetermined times relative to energizing of a mechanism coil, to compare the measured signal to a reference signal parameter, and to determine if the measured signal deviates from the reference signal parameter by a predetermined amount to indicate impairment of the rod control system. An example system may further include an output unit to output a signal when the measured signal deviates from the reference signal parameter by one or more predetermined amounts. In example embodiments, the reference signal parameter may be based on at least one of the following: an ideal exponential curve; an ideal linear curve; a work calculation from the reference rod movement mechanism input and output and the integral of a reference signal curve over a predetermined time interval.

An example embodiment of the present general inventive concept may provide a method of monitoring a rod control system of a nuclear power plant including calculating an impedance of at least one coil of a rod movement mechanism using a non-intrusive method that utilizes existing plant signals, thereby allowing impedance to be calculated in-situ while the rod control system is online. In example embodiments, the calculating may include comparing a measured impedance to a reference impedance, and determining if the measured impedance deviates from the reference impedance value by a predetermined amount to indicate degradations or failures of the rod control system. In example embodiments, the calculating may include analyzing current and voltage signals. In example embodiments, the calculating may include measuring a resistance of at least one of the following: a coil, a cable, and at least one connector and wherein a measured resistance is used to determine the coil temperature of a rod movement mechanism above a reactor core. In example embodiments, the calculating may include measuring an inductance of at least one of the following: a coil, a cable, and at least one connector. In example embodiments, the calculating may include analyzing the impedance of at least one coil. An example reference impedance may be based on historical impedance calculations of the at least one coil.

An example embodiment of the present general inventive concept may provide a method of monitoring a rod control system of a nuclear power plant including measuring voltage and current signals of at least one coil of a rod movement mechanism while the system is in operation in the plant, recording a plurality of impedance calculations over a period of time, calculating an impedance of the least one coil based on the measured voltage and current signals, and determining whether a current recorded impedance changes relative to a prior recorded impedance by a predetermined amount indicate degradation of the rod control system.

An example embodiment of the present general inventive concept may provide a system to monitor a rod control system of a nuclear power plant including an impedance measuring unit to measure an impedance of at least one coil of a rod movement mechanism during plant operation using a non-intrusive method for evaluation of the at least one coil, and a controller to compare a measured impedance to a reference impedance, and to determine if the measured impedance deviates from the reference impedance value by a predetermined amount to indicate degradation of the rod control system. An example controller may be configured to analyze current and voltage measurements of the at least one coil. In example embodiments, the reference impedance may be based on historical impedance measurements of the rod movement mechanism during operation of the nuclear power plant.

An example embodiment of the present general inventive concept may provide a system to monitor a rod control system of a nuclear power plant including an impedance determining unit to determine an impedance of at least one coil of a rod movement mechanism during plant operation using a non-intrusive method for evaluation of the at least one coil, and a controller to record a plurality of impedance calculations over a period of time, and to determine whether a current recorded impedance changes relative to a prior recorded impedance by a predetermined amount to indicate degradation of the rod control system.

An example embodiment of the present general inventive concept may provide a system to monitor a rod control system of a nuclear power plant, including an impedance measuring unit to measure an impedance of at least one coil of a rod movement mechanism during operation of the nuclear power plant operation using a non-intrusive method for evaluation of the at least one coil, and a controller to compare a measured impedance value to a reference impedance value, and to determine if the measured impedance value deviates from the reference impedance value by a predetermined amount to indicate degradation of the rod control system. The controller may be configured to analyze current and voltage measurements of the at least one coil. The reference impedance value may be based on historical impedance measurements of the rod movement mechanism during operation of the nuclear power plant.

An example embodiment of the present general inventive concept may provide a system to monitor a rod control system of a nuclear power plant, including an impedance measuring unit to calculate impedance values of the rod control system in situ during operation of the power plant, a recording unit configured to record a plurality of impedance calculations obtained over time during operation of the power plant, and a control unit configured to compare a current calculated impedance value with a prior recorded impedance value, and to determine if the current calculated impedance value deviates from the prior recorded impedance value by a predetermined amount to identify a problem with the rod control system. The impedance measuring unit may be configured to measure voltage and current values delivered to a lift coil of the rod control system over time, and the control unit may be configured to calculate an amount of work (W) delivered to the coil based on measured voltage and current values delivered to the lift coil over time, wherein the recording unit may be configured to store a plurality of work values delivered to the lift coil over time, and the control unit may be configured to compare a current work value to a prior work value to determine if the current work value deviates from the prior work value by a predetermined amount to detect changes in the amount of energy used to move a control rod. The impedance measuring unit may be configured to obtain voltage and resistance values of at least one of a lift coil, a cable, and a connector of the rod control system. The controller may be configured to determine a lift coil temperature based on an obtained resistance value. The system may further include a graphical output to display measured voltage and current values delivered to a lift coil over at least one step of a lift movement cycle.

An example embodiment of the present general inventive concept may provide a system to monitor a rod control system of a nuclear power plant, including an impedance measuring unit configured to obtain signal values from existing plant test points of at least one component of a rod movement mechanism during operation of the nuclear power plant, and to utilize the obtained signal values to determine a present impedance of the at least one component of the rod movement mechanism during the operation of the nuclear power plant, and a control unit configured to compare the present impedance to a reference impedance, and to indicate degradation of the rod control system if the present impedance deviates from the reference impedance by a predetermined amount. The impedance measuring unit may obtain voltage and current values as the signal values. The at least one component of the rod movement mechanism may include a coil, connector, cable, or any combination thereof in the rod movement mechanism. The reference impedance may correspond to historical impedance measurements of the rod movement mechanism during operation of the nuclear power plant. The system may further include a recording unit configured to record one or more determined impedances corresponding to the at least one component to determine the reference impedance. The impedance measuring unit may be further configured to measure a resistance of the at least one component to determine a temperature of the at least one component. The system may further include a graphical output configured to display one or more signal values associated with the at least one component. The display may include plotting the one or more signal values over a time period including one or more energy states and transitions between energy states of the at least one component. The present impedance may be recorded over a length of time including one or more energy states and transitions between energy states of the at least one component, the energy states including a fully energized state, a reduced state, an inactive state, or any combination thereof.

An example embodiment of the present general inventive concept may provide a method of monitoring a rod control system of a nuclear power plant using an example embodiment system such as described herein, the method including obtaining signal values from existing plant test points of at least one component of a rod movement mechanism during operation of the nuclear power plant, utilizing the obtained signal values to determine a present impedance of the at least one component of the rod movement mechanism during the operation of the nuclear power plant, comparing the present impedance to a reference impedance, and indicating degradation of the rod control system if the present impedance deviates from the reference impedance by a predetermined amount. The obtained signal values may be voltage and current values. The at least one component of the rod movement mechanism may include a coil, connector, cable, or any combination thereof in the rod movement mechanism. The reference impedance may correspond to historical impedance measurements of the rod movement mechanism during operation of the nuclear power plant. The method may further include recording one or more determined impedances corresponding to the at least one component to determine the reference impedance. The method may further include measuring a resistance of the at least one component to determine a temperature of the at least one component. The method may further include displaying one or more signal values associated with the at least one component on a graphical display. The displaying may include plotting the one or more signal values over a time period including one or more energy states and transitions between energy states of the at least one component. The present impedance may be recorded over a length of time including one or more energy states and transitions between energy states of the at least one component. The energy states of the at least one component may include a fully energized state, a reduced state, an inactive state, or any combination thereof. The determining, comparing, and indicating operations may be performed on a lift coil, moveable gripper coil, and stationary gripper coil during six stages of a rod withdrawal sequence, including: a first stage in which the stationary gripper coil is energized at a reduced state, and a stationary gripper is solely latched to the rod; a second stage in which the stationary gripper coil is energized to a fully energized state, and the moveable gripper coil is energized to the fully energized state to latch a moveable gripper to the rod; a third stage in which the stationary gripper coil is discharged to an inactive state such that the movable gripper is solely latched to the rod; a fourth stage in which the lift coil is energized to the fully energized stage until the rod is lifted a predetermined distance; a fifth stage in which the lift coil is discharged to the reduced state until the stationary grip coil is energized to the fully energized state to latch the stationary grip to the rod; and a sixth stage in which the lift coil and moveable gripper coil are discharged to the inactive state, and the stationary grip coil is discharged to the reduced state.

An example embodiment of the present general inventive concept may provide a method of monitoring a rod control system of a nuclear power plant, the method including establishing reference signals corresponding to normal operation of at least one coil of a rod control system during a step operation of the rod control system, the reference signals including a plurality of reference values corresponding to various energy states and transitions of energy states occurring during operational sequences of the at least one coil, obtaining in situ signals from the at least one coil during an operational sequence of the at least one coil during operation of the nuclear power plant, the in situ signals including a plurality of in situ values corresponding to various energy states and transitions of energy states occurring during present operational sequences of the at least one coil, comparing the in situ values to the reference values, and determining whether the in situ values associated with a particular energy state or transition of energy states deviates from a corresponding reference value associated with the particular energy state or transition of energy states by a predetermined amount, and, if so, associating the deviation with a particular degradation of the rod control system. Such a method may be performed by an example system configured according to an example embodiment of the present general inventive concept. The at least one coil may include a lift coil, a movable coil, a stationary coil, an upper gripper coil, a pulldown coil, a load transfer coil, a lower gripper coil, or any combination thereof, wherein each coil has its own respective operational sequence including various respective energy states and transitions of energy states occurring during operation sequences of each respective coil, wherein the reference values and in situ values include a plurality of values corresponding to the various respective energy states and transitions of energy states, and wherein the determining operation includes determining whether the in situ values associated with any one or more of the respective energy states or transitions of energy states deviates from a corresponding reference value associated with the particular respective energy state or transition of energy state.

An example embodiment of the present general inventive concept may provide a method of monitoring step movements of control rods of a nuclear power plant including measuring output signals of a plurality of rod movement coils during a step movement sequence of one or more control rods, analyzing the output signals to verify the rod movement, and analyzing the output signals to determine a direction of the step movement sequence. An example method may further include verifying step movement sequence. An example method may further include verification of mechanical movement of the mechanism as it relates to the rod step movement sequence. An example method may further include decrementing or incrementing a step counter based on the analyzing and comparing operations. An example method may further include generating a warning signal if a determined direction of step movement does not correspond to a commanded direction of step movement and/or if a difference between the one or more output signals deviates from the reference signal by a predetermined amount. An example method may further include displaying step information.

An example embodiment of the present general inventive concept may provide a step counter system for a rod control system of a nuclear power plant including a measuring unit to measure output signals of a plurality of rod movement coils during a step movement sequence of one or more control rods, and a controller to analyze the output signals to determine a direction of the step movement sequence, analyzing the output signals to verify the rod movement. In example embodiments, the controller may be configured to decrement or increment a step counter based on a determined direction of the step movement sequence and a comparison to one or more output signals of the reference output signal. In example embodiments, the controller may be configured to generate a warning signal if a determined direction of step movement does not correspond to a commanded direction of step movement and/or if a difference between the one or more output signals deviates from the reference sequence by a predetermined amount. An example system may further include a display unit to display step counter information based a determined direction of the step movement sequence and verification through a comparison of the one or more output signals to the reference rod movement sequence.

The examples described herein provide a metric which may be utilized to diagnose rod movement problems because the calculation results may be predictable from step to step wherein a significant variation from normal may be noticed because of one or more problems, such as improper rod movement, rod movement failure, electrical degradation, mechanical degradation, etc., exists. Changes in the level of work, and/or changes in impedance and related values, can detect problems with the mechanism.

It is noted that the simplified diagrams and drawings do not illustrate all the various connections and assemblies of the various components, however, those skilled in the art will understand how to implement such connections and assemblies, based on the illustrated components, figures, and descriptions provided herein, using sound engineering judgment.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

While the present general inventive concept has been illustrated by description of several example embodiments, it is not the intention of the applicant to restrict or in any way limit the scope of the inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings.

What is claimed is:

1. A system to monitor a control rod movement mechanism of a nuclear power plant, comprising:
   an electrical connector configured to connect to one or more test points of the control rod movement mechanism;

an impedance measuring unit configured to obtain signal values from the test points during operation of the nuclear power plant, and to determine a present impedance of at least one component of the control rod movement mechanism based on obtained signal values; and a control unit configured to compare the present impedance to a reference impedance, and to generate a graphical output indicating degradation of the control rod movement mechanism if the present impedance deviates from the reference impedance by a predetermined amount.

2. The system of claim 1, wherein the impedance measuring unit obtains voltage and current values as the signal values.

3. The system of claim 1, wherein the at least one component of the control rod movement mechanism includes a coil, connector, cable, or any combination thereof.

4. The system of claim 1, wherein the reference impedance corresponds to historical impedance measurements of the control rod movement mechanism during operation of the nuclear power plant.

5. The system of claim 1, further comprising a recording unit configured to record one or more determined impedances corresponding to the at least one component to determine the reference impedance.

6. The system of claim 1, wherein the impedance measuring unit is further configured to measure a resistance of the at least one component to determine a temperature of the at least one component.

7. The system of claim 1, further comprising a graphical output configured to display one or more signal values associated with the at least one component.

8. The system of claim 7, wherein the graphical output includes plotting the one or more signal values over a time period including one or more energy states and transitions between energy states of the at least one component.

* * * * *